United States Patent Office 3,135,612
Patented June 2, 1964

3,135,612
PROCESS FOR AGGLOMERATING
CULINARY MIXES
Eddy R. Hair, Colerain Township, Hamilton County, and Benjamin Lawrence, Springfield Township, Hamilton County, Ohio, assignors to The Procter & Gamble Company, Cincinnati, Ohio, a corporation of Ohio
No Drawing. Filed Apr. 19, 1962, Ser. No. 188,887
4 Claims. (Cl. 99—94)

This invention relates to the agglomeration of pulverulent materials, and more particularly, to the agglomeration of flour-containing food particles to provide a non-sticky, free-flowing culinary mix which can be readily blended with or mixed in water and other aqueous systems.

In recent years there has been a trend toward providing the consumer with ready-to-use products having various built-in convenience and time-saving qualities. This has been particularly notable in the culinary arts such as in the field of the prepared mixes of one sort or another.

For example, it is now possible for household consumers, as well as commercial bakeries, to prepare baked goods from prepared mixes which contain many of the essential ingredients of the finished food product in a pre-mixed condition.

Frequently however, the prepared food mixes contain ingredients which are not readily dispersible in aqueous systems, such as in a cake batter. One of the important ingredients which is usually incorporated in a cake batter is flour. However, it is well known that fine particles of flour commonly wet with difficulty upon admixture with water, and form unwetted lumps in the cake batter instead of a smooth mixture. A means for providing improved wettability and dispersibility of such difficultly soluble food materials would find much use in the culinary arts.

Accordingly, it is a primary object of this invention to provide a free-flowing flour-containing culinary mix having improved wettability and dispersibility in aqueous systems.

Another object is to provide a method of forming a dry culinary mix which is non-sticky and highly flowable and can be readily mixed or blended with water to form a lump-free dough or batter.

Still another object is to provide an improved process for combining the various ingredients of a flour-containing culinary mix into aggregates to prevent their mechanical segregation into layers of particles of differing sizes and densities during storage or other handling.

A further object is to provide a simplified process for agglomerating flour particles with edible liquids to produce a free-flowing, non-sticky culinary mix without drying.

Still a further object is to provide a method for combining flour with sugar and/or shortening to produce a dry culinary mix having enhanced blending and mixing properties.

Briefly stated, the process of this invention comprises contacting the pulverulent food particles with a finely atomized spray of a sticky cohesive binding liquid substance and thoroughly agitating the mass of said particles in a gentle manner sufficient to blend the sticky liquid uniformly therein and roll up the treated particles into non-sticky, free-flowing aggregates without drying, said aggregates having a larger particle size than the unagglomerated particles and improved mixing and blending properties in aqueous systems.

By means of the aforesaid agglomerating process, it is possible to provide free-flowing, non-sticky culinary mixes having a great variety of ingredients. For example, among those materials which can be agglomerated by the process of this invention are cake mixes containing flour, sugar, shortening, and other ingredients; pancake mixes; party mixes; confectionery mixes; powdered beverages; and other pulverulent substances in general. This invention is particularly useful for the preparation of flour-containing mixes having sugar and/or shortening incorporated therein.

Most of the prior art agglomerating methods require a final drying step in order to recover a product that is both non-sticky and microbiologically stable. The usual agglomerating methods which require substantial amounts of steam or water as the agglomerating fluid generally require drying of the final aggregates to reduce their moisture content to a level which does not impart stickiness to the product and which does not support the growth of bacteria and mold. A primary advantage of the process of the present invention is its ability to provide a free-flowing aggregate having improved mixing properties that is both non-sticky and resistant to microbial spoilage, yet requires no drying of product subsequent to the treatment with the agglomerating fluid.

It has now been found possible to avoid the usual drying procedure by providing for a unique depositing of an edible sticky cohesive binding liquid onto the dry particles while they are tumbled or otherwise agitated in a manner whereby the said binding liquid loses its stickiness and becomes an integral constituent of the agglomerated mix.

As used herein, the term "liquid" is intended to define a fluid agglomerating substance existing in a liquid phase and excludes the presence of functional crystalline or other solid particles greater than about $0.2\mu$ in diameter. However, it is not hereby intended to exclude the presence in the agglomerating liquid of minor amounts of non-functional, inert solid matter.

The agglomerating liquids of this invention are edible, sticky, cohesive, binding substances such as a melted or normally liquid glyceride shortening or a highly concentrated aqueous sugar solution which can be deposited on the mix in certain levels and intimately blended therewith to become an integral constituent of the said mix.

Shortening and sugar solution are the preferred substances to be used as agglomerating liquids for the preparation of dry flour-containing mixes. Both substances are common ingredients of flour-containing products such as cakes, pancakes and the like, while shortening is also an important ingredient of pastry products such as a dough. These ingredients are usually blended with flour and other materials by ordinary mixing methods during the preparation of a batter or dough by the consumer or during the production of a dry prepared mix by the manufacturer. It has now been found, however, that if these substances are blended in liquid form, as hereinafter described, in certain proportions with the flour and other materials, a superior dry prepared mix with markedly enhanced blending and mixing properties can be prepared.

Although these agglomerating liquids may be added to the mix before it is agitated, it is preferable to add the liquid while tumbling or other agitation is in progress. The most satisfactory method of applying the binding liquid is by means of spraying through an atomizing nozzle. A fine spray of sticky liquid applied to a slowly agitated mix provides a thorough and homogeneous blending of a sufficient amount of binding substance with the individual powdered particles and simultaneously rids the said liquid of its inherent stickiness as it is rolled up into the dry aggregates produced thereby.

One method of agitating the moistened particles to produce the free-flowing, non-sticky aggregates without drying is by means of tumbling in a device such as a cylindrical chamber mounted on a horizontal, or slightly inclined, axis and slowly rotating thereon. As the sticky binding liquid of the present invention is sprayed onto the mix which is tumbled in the said manner, the constituent particles of the mix will gently roll up and over each other and adhere together to form aggregates, while the binding liquid is simultaneously depleted of its sticky characteristics and homogeneously blended into the said aggregates.

In a preferred embodiment of this invention the flour-containing particles are placed in a tumbling cylinder mounted on a horizonal axis. The particles should form a fairly shallow bed of material, for example, up to a maximum depth of about 2 to 8 inches thick when at rest in a tumbling cylinder having a diameter of about 2 feet. The cylinder is slowly revolved about its axis at a speed of about 5 to 50 r.p.m. The sticky cohesive agglomerating liquid under a high pressure is sprayed through an atomizing nozzle onto the slowly tumbling mix. The gentle agitation produced by this tumbling mechanism provides for a high probability of contact between the particles without thereby producing an overly hard compaction. It also permits the fine spray of sticky cohesive liquid to become thoroughly dispersed throughout the mixture so that an optimum aggregation of particles can be attained with a maximum loss of stickiness therein. The resulting loosely-compacted aggregate product can be readily blended with or mixed into water and other aqueous systems to form a batter or dough.

Another method of tumbling and spraying comprises atomizing the sticky binding liquid onto a gently agitated fluidized bed of the material to be agglomerated.

The powdered particles which are sprayed and agitated in the hereinbefore-described manner from aggregates which are free-flowing, non-sticky, and ready to be packaged or otherwise used without drying. In this manner, heat-sensitive ingredients of the aggregates, such as flour and the like, are kept completely free of even moderately elevated drying temperatures. In addition, the frangible aggregates are not subjected to breakage which might be caused by the mechanical action of any drying process. The absence of such drying also provides for a consequent reduction in capital investment and processing costs which are otherwise necessary in the usual agglomerating processes.

The following examples illustrate the process of this invention, but the invention is not limited to these specific examples.

*Example 1*

A culinary mix was prepared by mixing together the following ingredients:

| | Weight percent |
|---|---|
| Bleached cake flour | 37.8 |
| Sugar (9 parts sucrose; 1 part dextrose) | 49.7 |
| Plastic fatty acid triglyceride soybean oil-derived shortening emulsified with mono- and diglycerides and glyceryl lactyl stearate | 12.5 |

A 40-lb. batch of the said mix, having a moisture content of about 3.8%, was heated to about 110° F. and then agglomerated in a slowly rotating horizonal cylindrical chamber about 2 feet long, 2 feet in diameter, and provided on its inner surface with 4 longitudinal radially disposed baffles, each about 2 inches high. A sticky binding liquid was prepared by mixing 3 parts of sucrose with 1 part of water and heating to 180° F. This liquid, under a pressure of 3000 p.s.i., was then sprayed onto the mix from an atomizing nozzle for 3 minutes while the cylinder was being rotated at a speed of about 20 r.p.m to produce an agglomerated mix having a total moisture content of about 4.9 percent.

The agglomerated mix consisted of free-flowing, dustless, non-sticky, loosely-compacted aggregates.

The particle size of the said aggregates in comparison with the initial unagglomerated particles is indicated by the screen analysis shown in the following table.

| | Percent Collected on Screen | |
|---|---|---|
| Screen Size | Initial Mixture | Agglomerated Mixture |
| On 20 Tyler Mesh | | 6.5 |
| On 24 Tyler Mesh | | 1.5 |
| On 35 Tyler Mesh | 1.7 | 11 |
| On 48 Tyler Mesh | 6.5 | 22 |
| On 65 Tyler Mesh | 27.0 | 19.5 |

The rest of the particles passed through the 65 mesh screen.

The agglomerated mix wetted-out in about 30 seconds and produced a smooth batter with no lumping when stirred into a slurry in a ratio of 3.5 parts of water to 6.5 parts of mix. By way of comparison, the unagglomerated mix wetted-out in 40 seconds and produced a lumpy batter. The agglomerated mix is eminently suitable for use as a component in a prepared dry cake mix and will bake into an excellent cake with additional ingredients consisting of 2% leavening, 2% milk solids, 1% sodium chloride and 4% cocoa, said percentages by weight of the total dry cake mix.

*Example 2*

Example 1 was repeated except that the spraying time was increased to 4.5 minutes with the result that the agglomerated mix attained a moisture content of about 5.8%.

The agglomerated mix consisted of free-flowing, dustless, non-sticky aggregates having a particle size as indicated by the screen analysis shown in the following table.

| Screen size: | Percent collected on screen |
|---|---|
| On 20 Tyler mesh | 8 |
| On 24 Tyler mesh | 1.5 |
| On 35 Tyler mesh | 12 |
| On 48 Tyler mesh | 23 |
| On 65 Tyler mesh | 18 |

The rest of the particles passed through the 65 mesh screen.

The agglomerated mix wetted-out in about 22 seconds and produced no lumping of batter when tested by the method described in Example 1. The dry mix can be conveniently used in a cake mix formulation for the preparation of good quality cakes.

*Example 3*

A culinary mix was prepared in the following manner:

A batch of wheat flour was cooled to a temperature of about −50° F. and then agglomerated in a horizontal cylindrical chamber having a diameter of about 2 feet and a length of about 2 feet, and rotating about its axis at 20 r.p.m. A sticky binding liquid was then prepared by heating a plastic glyceride shortening to about 160° F. and maintaining it at about that temperature level. The shortening consisted of about 94% of a mixture of soybean and cottonseed oils hardened to an iodine value of about 70 to 75, blended with about 6% of vegetable oil hardstock. The shortening had a Solids Content Index of about 20 at 70° F. as determined by the method described in 31 J.A.O.C.S., 98–103 (March 1954). This melted shortening, under a pressure of about 1000 p.s.i., was sprayed onto the flour from an atomizing nozzle for 13.6 minutes while the cylinder was being rotated at a speed of about 20 r.p.m. to produce an agglomerated mix having a total shortening content of about 38.2 percent.

The agglomerated particle size is indicated by the screen analysis shown in the following table.

| Screen size: | Percent collected on screen |
|---|---|
| On 7 Tyler mesh | 6.7 |
| On 14 Tyler mesh | 11.9 |
| On 20 Tyler mesh | 52.6 |
| On 42 Tyler mesh | 25.9 |

The rest of the particles passed through the 45 mesh screen.

In comparison with the final aggregates, all of the initial unagglomerated particles passed through a 100 mesh screen.

The agglomerated mix was free-flowing and non-sticky. Its high suitability for the convenient preparation of a pastry mix was shown by its ready hydration and water acceptance to form a lump-free dough when mixed with water in the proportion of about 1 part water to 5 parts mix by weight.

The above examples illustrate the use of melted fat or aqueous sucrose solution sa the sticky liquid binding agent to cause the pulverulent particles to adhere to each other. Various other edible sticky materials can also be used with comparable results. Examples of such materials are colloidal tending substances such as aqueous starch solutions, hydrophillic gums such as the water-soluble salts of carboxymethyl cellulose, and various emulsifiers; aqueous solutions of other water-soluble sugars such as dextrose and invert sugar; and various polyhydric alcohols such as propylene glycol and glycerol.

When a sugar solution is used as the binding agent, its concentration can be varied somewhat from the preferred 3:1 weight ratio of sugar to water shown in Examples 1 and 2, above, and still produce a highly wettable, non-sticky, free-flowing agglomerate without drying. Satisfactory results are obtained by using ratios of about 1½:1 to about 4:1 parts by weight of sugar to water.

In the use of a sucrose solution for spraying a prepared cake mix comprising from about 25 to about 50 weight percent flour, from about 5 to about 20 weight percent shortening, from about 30 to about 50 weight percent sugar, and small amounts of other ingredients, it is preferable to use about a 3:1 concentration of sucrose to water in an amount which is sufficient to produce a moisture content in the agglomerated mix solids of about 5%, although the moisture content of the said mix can vary from about 2 to about 10 weight percent without loss of the primary benefits of this invention.

Similarly, edible liquid fats and oils other than the melted shortening shown in Example 3, above, can be used in the process herein described with comparable results. For example, any of the ordinary plastic, semifluid or liquid glyceride shortenings of animal, vegetable, marine, or synthetic origin are usable so long as they have inherent sticky characteristics, and are sprayed as a liquid in an atomized form onto the powdered food particles. These glycerides can have saturated or unsaturated long chain fatty acid groups having from about 12 to about 22 carbon atoms and are generally obtained from edible oils and fats such as cottonseed oil, soybean oil, coconut oil, rapeseed oil, lard, and the like. The glycerides also can contain one or two short-chain fatty acid groups having from about 2 to about 10 carbon atoms or can be prepared by various random or low-temperature interesterification reactions.

The shortenings can also contain various amounts of emulsifiers and other agents such, for example, as mono- and diglyceride emulsifiers, lactylated glyceride emulsifiers, free fatty acids, and numerous other substances commonly used in shortenings to improve their cooking and other properties. In the case of the hardened glycerides or the plastic shortenings, it is necessary that they be sufficiently heated to become liquid and atomizable, and maintained at about that temperature. In general, cooling before atomization should be avoided since it is necessary to prevent crystallization of the shortening before it is sprayed onto the tumbling dry particles.

While the amount of liquid shortening to be sprayed can be varied, depending somewhat on the ultimate agglomerated composition desired, a free-flowing pastry mix can be prepared by spraying from about 15 to about 45 parts by weight of shortening onto about 55 to about 85 parts by weight of dry particles consisting principally of flour.

In order to maximize the flowability and mixing properties of a pastry mix comprising flour and shortening, it is preferable to spray from about 25 to about 40 parts by weight of a shortening having a Solids Content Index at 70° F. in excess of 5 onto about 60 to about 75 parts by weight of dry particles consisting principally of flour. The shortening should be heated until it is completely melted and then maintained at about that temperature so that it can be sprayed onto the agitated dry particles while still liquid. The dry particles can also contain various other ingredients of pastry doughs such as salt, dextrose, starch and flavoring materials.

The flour employed in this invention is of the sort commonly used in present-day culinary mixes of the types herein described. For example, with cake mixes it is preferable to use a bleached cake flour, although hard wheat flours or general purpose flours can also be used. For pastry mixes it is preferable to use an unbleached pastry flour, although other types of flour can be used in some instances, if desired.

Although the invention has been described with particular reference to prepared mixes such as flour-containing culinary mixes, the invention is not limited thereon; other pulverulent materials such, for example, as dry milk solids and confectionery powders may be treated in the hereinbefore-described manner to produce non-sticky, free-flowing, highly wettable aggregates.

What is claimed is:

1. The method of agglomerating a pulverulent cake mix comprising from about 25 to about 50 weight percent flour, from about 5 to about 20 weight percent shortening and from about 30 to about 50 weight percent sugar which comprises: contacting the cake mix particles with a thorough dispersal of a finely atomized spray of concentrated aqueous sugar solution having a weight ratio of sugar to water of about 1½:1 to about 4:1, the amount of said sugar solution being sufficient to produce a moisture content in the agglomerated mix solids of from about 2 to about 10 weight percent; and agitating the mass of said particles in a shallow bed having a depth not exceeding about 8 inches thick with a gentle tumbling force within a substantially horizontally disposed cylinder rotating about its longitudinal axis at a speed of from about 5 to about 50 r.p.m. sufficient to blend said sugar solution uniformly therein and roll up the treated particles upon each other into free-flowing, loosely-compacted aggregates without drying, said aggregates having a larger average particle size than the unagglomerated particles and characterized by improved blending and mixing properties in aqueous systems.

2. The method of claim 1 in which the sugar solution is a concentrated aqueous sucrose solution having a weight ratio of sucrose to water of about 3:1.

3. The method of agglomerating a pulverulent pastry mix comprising from about 55 to about 85 weight percent flour and from about 15 to about 45 weight percent shortening which comprises: contacting from about 55 to about 85 parts by weight flour particles with a thorough dispersal of a finely atomized spray of from about 15 to about 45 parts by weight melted glyceride shortening particles and agitating the mass of said flour and shortening particles in a shallow bed having a depth not exceeding about 8 inches thick with a gentle tumbling force within a substantially horizontally disposed cylinder rotating about its longitudinal axis at a speed of from about 5 to about 50 r.p.m. sufficient to blend said shortening uniformly in the flour and roll up the treated particles upon each other into free-flowing loosely-compacted aggregates, said aggregates having a larger average particle size than the unagglomerated particles and characterized by improved blending and mixing properties in aqueous systems.

4. The method of claim 3 in which the shortening has a solids content index greater than about 5 at 70° F.

References Cited in the file of this patent

UNITED STATES PATENTS

| | | |
|---|---|---|
| 2,436,771 | Hood | Feb. 24, 1948 |
| 2,893,871 | Griffin | July 7, 1959 |
| 2,957,771 | Prater et al. | Oct. 25, 1960 |
| 2,995,773 | Gidlow et al. | Aug. 15, 1961 |

OTHER REFERENCES

"American Miller and Processor," January 1948 (page 81).